F. H. PIERPONT.
LEADING ATTACHMENT FOR COMPOSING MACHINES.
APPLICATION FILED JULY 26, 1909.

980,998.

Patented Jan. 10, 1911.
6 SHEETS—SHEET 4.

Witnesses

Inventor
Frank H Pierpont
By Church & Church
his Attorneys

F. H. PIERPONT.
LEADING ATTACHMENT FOR COMPOSING MACHINES.
APPLICATION FILED JULY 26, 1909.

980,998.

Patented Jan. 10, 1911.

Witnesses
Thomas Durant

Inventor
Frank H Pierpont
By Church & Church
Attorneys

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

LEADING ATTACHMENT FOR COMPOSING-MACHINES.

980,998.   Specification of Letters Patent.   Patented Jan. 10, 1911.

Application filed July 26, 1909. Serial No. 509,588.

*To all whom it may concern:*

Be it known that I, FRANK HINMAN PIERPONT, a citizen of the United States, residing at Horley, county of Surrey, England, have invented a certain new and useful Improvement in Leading Attachments for Composing-Machines; and I do hereby declare the following to be a full, clear, and exact description of the same, reference being had to the accompanying drawings, forming a part of this specification, and to the figures and letters of reference marked thereon.

This invention relates to a leading mechanism or attachment for type setting or composing machines and is particularly applicable to automatic machines, or machines the operation of which is controlled or governed by a pattern, record strip or controller.

The chief object of the present invention is to provide a simple and efficient mechanism which, by occupying a minimum of space, will not encumber the machine or interfere with the operator's view of the galley and line mechanism or the operation thereof, and which can be brought into, or thrown out of, action automatically in response to a signal in the record-strip or controller; also in its application it will not of necessity call for structural alterations in the composing or setting machine to which it is attached, the attachment being such that the device can be readily turned out of the way when not in use, or quickly removed bodily from the machine.

In the accompanying drawings illustrating a preferred form of embodiment of said invention Fig. 1ª is a similar view of the right half of said machine.

The same letters and numerals of reference wherever repeated throughout the drawings indicate the same parts.

The leading attachment includes as its principal elements a frame A detachably secured to the machine with which it is associated, and provided with a magazine for leads represented by parallel bars $A'$ $A^2$, one or more pushers in the form of a recessed slide or slides supported in guides or bearings C on bars $A'$ $A^2$ and forming a gate at the outlet or delivery end of said magazine; a spring actuated follower mounted on frame A and engaging the rear end of the column of leads in the magazine; actuating devices for the pushers mounted upon a moving part of the machine to which the attachment is applied and capable of being coupled with and uncoupled from said pushers at will; and controlling means for said actuating devices including starting and stopping devices H, the latter controlled by the record strip and actuated by a moving part of the machine to alternately couple and uncouple the actuating devices and pusher.

It is not intended to limit the invention in its application to any particular composing or type setting machine, but, for the purposes of illustration it is shown in the drawings annexed to this specification, and will be described as adapted and applied to the galley of a type casting and composing machine such as forms the subject of Patent No. 625,998, dated May 30, 1899, to the specification of which patent reference may be had for a detailed description of the machine, as it is only considered necessary to refer here to parts more intimately connected with the leading attachment and the parts by which the leading attachment is brought into operation.

The casting and composing machine according to the aforesaid patent is controlled by a pattern in the form of a perforated record strip or controller and the perforations control, by the admission of air, the projection of pins by which a die case is centered over the mold, but in addition, perforations occur in the record strip at the end of each composed line by which the galley mechanism is operated, the completed line being shifted longitudinally in the line channel to a point opposite the galley entrance and then moved laterally through said entrance into the galley.

Figure 1:
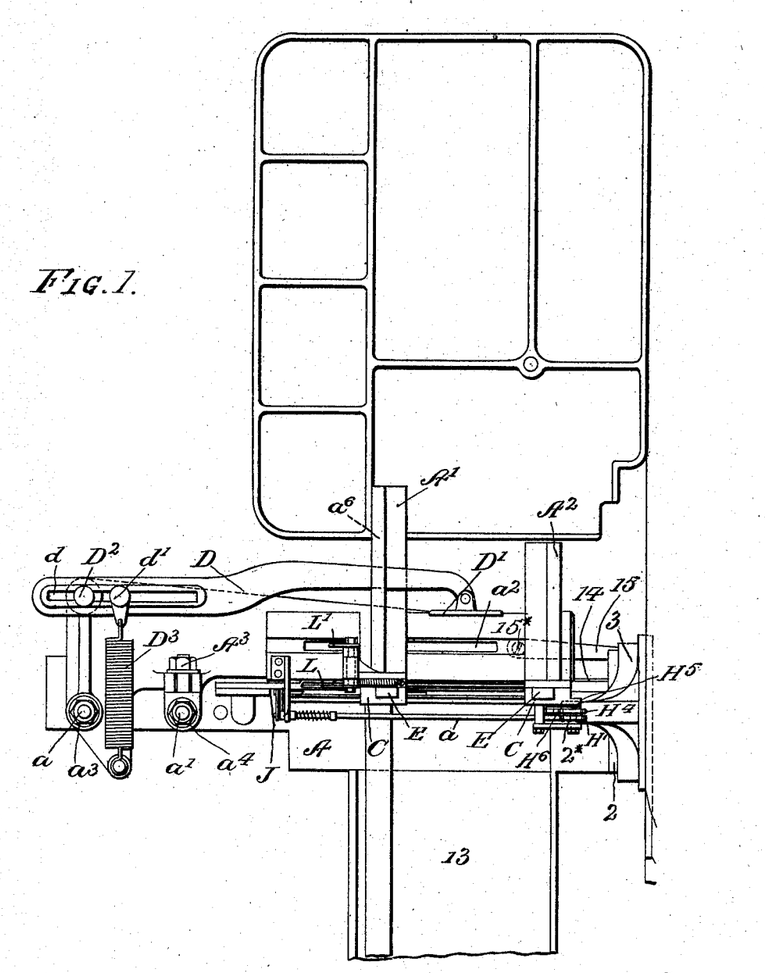
—Figure 1 is a plan view of the left half of a leading attachment according to this invention, and showing it applied to an automatic type casting and composing machine of well known construction.
Figure 1A:
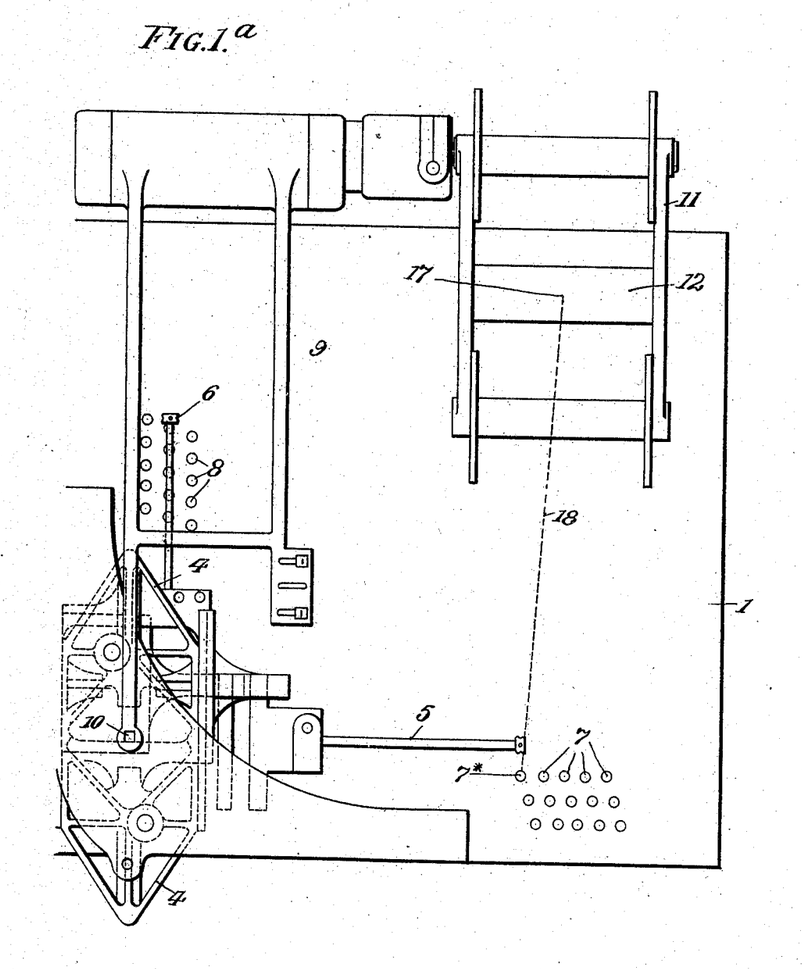
Figure 2:
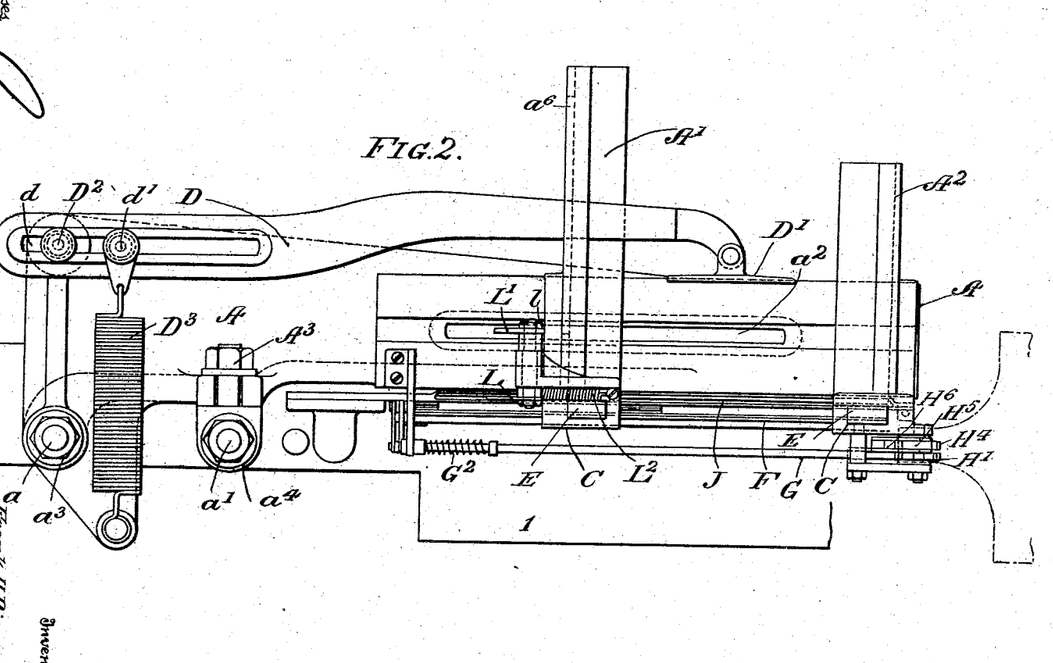
Fig. 2 is a plan view similar to Fig. 1, but to a larger scale and showing the leading attachment separately.

The parts concerned, of the existing mechanism, are shown in Figs. 1 and 1ᵃ, wherein 1 indicates more or less diagrammatically the top plate of the machine. 2 is the die case containing rows of matrices which, by a compound motion of the die case in two directions at right angles to one another, are adapted to be centered individually over the casting mold (not shown, but which is situated beneath the member 10.) 3 is the carrier for the die-case, and 4 the supporting frame for the die-case carrier. 5 is the actuating rod coupled to the die case; 6 a similar actuating rod secured to the die-case carrier; 7 are the pins acting in coöperation with the rod 5 by which the die case, by moving relatively to its carrier, is centered in one direction; and 8 are the pins coöperating with the rod 6, by which the die case carrier by moving in relation to the supporting frame at right angles to the movement of the die case, centers the die-case in the other direction; the pins of both sets are actuated pneumatically; 9 is the main actuating lever for lifting and lowering the die-case; 10 is the die centering pin lever to center the selected die; 11 is the paper tower and paper feed mechanism; 12 is the cross bar containing the air ports communicating some with the pins of series 7 and others with pins of series 8, the pins being projected when perforations in the record strip coincide with their ports in the cross bar; 13 is the galley into which the completed lines of type are passed and arranged columnwise; 14 is the line channel wherein the types of a line are assembled on delivery from the mold until the line is completed; 15 is the line carrier which by being reciprocated once at the end of the casting operations for each line conveys a completed line of types to the galley entrance; and J a vertically movable rule that normally closes the entrance to the galley and is raised to uncover said entrance when the line has been brought opposite thereto by the line carrier preliminary to the advance of the line transferrer (not shown) the latter operating to move the assembled line bodily into the galley. The line carrier 15, the line transferrer and the vertically movable rule J are all indirectly controlled by the perforations formed at the end of the line in the record strip.

The main frame A of the leading devices, forming the subject of the present invention, is attached to the bed 1 of the composing machine in such a manner that the leads are carried in the guides or supports $A'$ $A^2$ of the magazine directly over the entrance to the galley 13 of the composing machine. The frame A is secured to the bed 1 by two bolts $a$ $a'$ which pass through lugs on the frame A and into holes in the machine frame 1. The lug $a$ is formed in one with frame A and the lug $a^4$ is attached thereto by a stud $A^3$ so that by unscrewing this stud the entire attachment can be turned around, on the bolt $a$ as a pivot, out of the way when not in use or when it is required to gain access to the parts of the composing machine situated at or near the entrance of the galley or the line assembly channel. The leading attachment is situated at a higher level than the galley so that it is out of the way of the mechanism acting in connection with the line channel and does not interfere with the vertical movement of the rule J and the transference of the line of composed matter from the line channel to the galley, while it leaves the channel and galley open to the view of the attendant. The guides or supports $A'$ $A^2$ upon which the opposite ends of the leads rest, are in the form of channels, and one of these $A'$ is made adjustable relatively to the other so that the device can be adapted to receive leads of different lengths in accordance with the measure in which the matter is being composed. Conveniently the support $A'$ has secured to its underside a screw threaded post which passes through an opening $a^2$ in the frame A and is secured in position in this slot by a clamping nut $a^5$ or its equivalent. The leads in the magazine are constantly pressed toward the outlet by the lever D, to one end of which is pivoted a plate $D'$ or follower adapted to bear on the rearmost lead and at its other end the lever D has a slot $d$ through which a pivot pin $D^2$ passes. The slot $d$ allows the lever to be adjusted longitudinally in accordance with the length of the leads being used. A spring $D^3$ is secured at one end to a lug on the frame A and at its other end to a pin $d'$ passing through the slot $d$ in the lever D thereby causing the lever to press constantly against the leads while the slot and pin connection allows for the aforesaid adjustment of lever D. A slot $a^6$ is formed in the wall of the support $A'$ for the passage of the lever D.

Figure 7:
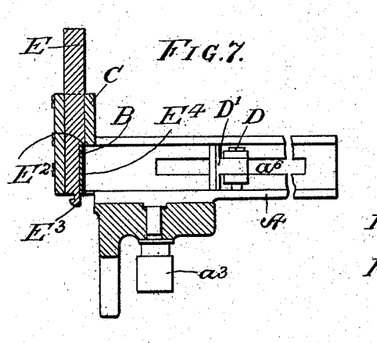
Figure 8:
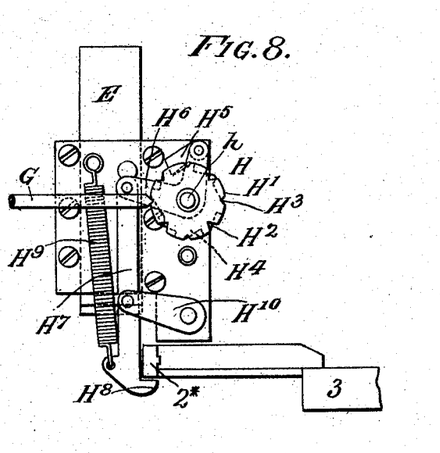
Fig. 8 is an elevation showing a portion of the automatic actuating mechanism.

Opposite and contiguous to the outlet from the magazine for the leads are the reciprocating slides or pushers E, conveniently two in number, mounted in bearings in the two face plates or posts C on bars $A'$ $A^2$. Under the action of the spring controlled lever D the leads are forced to the outlet B of the magazine and the slides or pushers are in their upper or normal position (see Fig. 7) when the foremost lead is forced against the front faces of the pushers E E which as shown are undercut or have projecting shoulders $E^2$, so that when the foremost lead is pressed under the shoulders $E^2$ and the pushers are moved downward the shoulders will engage the upper edge of the lead and force it down. The depth of the undercut portions is equal to the thickness of the lead, so that when one lead is in position a second cannot be engaged by the shoulders and prevent the slides from descending. In their continued descent the pushers E E close temporarily the outlet of the magazine or holder so that another lead cannot move forward over the outlet or delivery opening between the pushers and ends of bars $A'$ $A^2$ until the slides have been raised again, when another lead will be forced into the undercut parts of the slides and held there by the pressure of the spring controlled follower $D'$ until the slides or pushers again move downward. These pushers normally stand in their upper position and are retained thus by the influence of the follower $D'$ acting through the leads, so that a lead is always in a position to be delivered by the pushers or slide. At their lower outer ends the pushers E E are provided each with a hook $E^3$ with which the latch F engages to draw the slides downward and bring with them the foremost lead in the magazine.

The latch F (see Figs. 3 to 6 and 7) is actuated to engage the hooks $E^3$ only when it is desired that a lead should be delivered. Although latch F is raised and lowered each time a line is to be transferred from the line assembly channel to the galley, it is only permitted to actuate the slides E E when leading is required. At other times, although it is raised and lowered, it is held out of engaging position with the hooks $E^3$ (see Fig. 5). Conveniently the latch is carried by the reciprocating galley rule J which normally closes the entrance to the galley (see Figs. 1, 3 and 6) and acts as a support for the line in the line channel. This rule J acts in the same manner as the galley rule in the machine according to the aforesaid patent, the only difference being that whereas in the said machine the galley rule is solid, in the present instance it is slotted or is hollow, so that being situated immediately beneath the outlet of the magazine the lead engaged by the pusher is delivered into the slot in the rule and is guided down to the bed of the machine level with the galley and thus prevented from falling over on to its face. When the leading attachment is in operation, the mechanism which normally engages with the latch and holds it open or prevents it engaging the hooks $E^3$ as above stated, is withdrawn so that the latch F snaps over the hooks $E^3$ (see Fig. 4) and on the return or downward movement of the slide J, carries the pushers E E with it.

Figure 4:
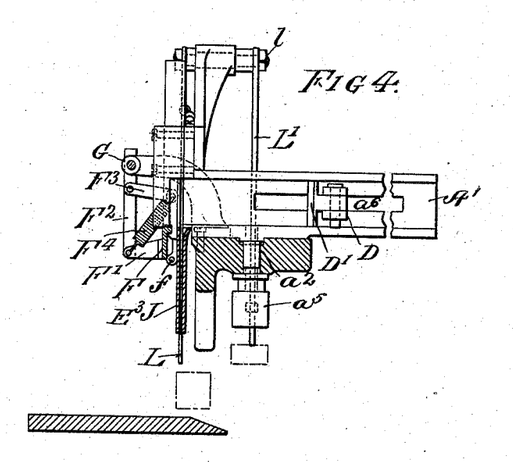
Figs. 4, 5, 6 and 7, are sectional elevations of the mechanism according to Figs. 2 and 3, showing the parts in different positions which they occupy during the cycle of operations.
Figure 5:
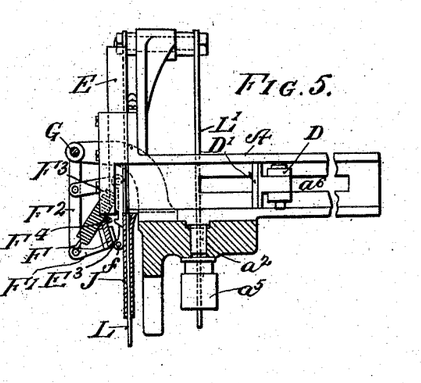

The slide J is raised, conveniently by a cam, to the position shown in Figs. 4 and 5 when the assembled and completed line has been brought into line with the entrance to the galley by the line-carrier 15, and when so raised permits the line to be forced laterally by the line transferrer into the galley.

On the downward movement of the rule J with the latch F engaging the hooks $E^3$ on the pushers E E, the lead which has its upper edge under the offsets on these slides, is drawn down beyond the influence of the spring-controlled lever D and then falls down into the slot in the rule J, being meantime maintained in its upright or on-edge position by the walls of the slot. The lead being now within the rule J when the latter reaches its lower position, is in such a position that when the rule again rises to allow another line to be delivered from the line channel to the galley the lead remains behind and is thereby positioned between the line of types last delivered to the galley and the line for the reception of which the rule has been raised. The lead is pushed into the galley with the incoming line by the line transferrer, and the rule returns with another lead within it to be transferred to the galley, in the manner already described, with the succeeding line.

Figure 3:
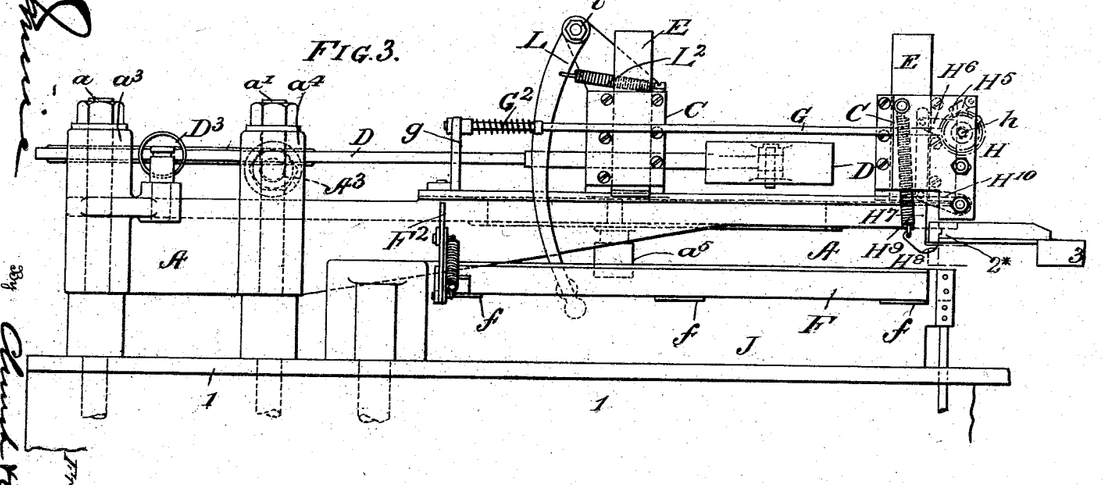
Fig. 3 is a front elevation of the mechanism shown in Fig. 2.
Figure 6:
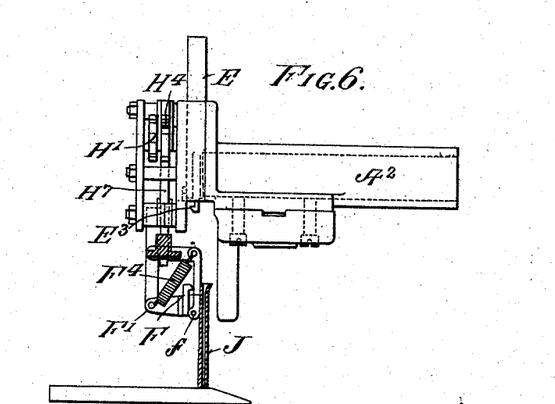

The latch F, as already stated, is carried by the rule J, to which it is hinged, as at $f$, and to render it effective or not effective there is provided at or near one end an outwardly projecting lever $F'$ (see Figs. 4, 5 and 6) to which is pivoted one end of an upstanding rod or link $F^2$ having its other end pivoted to the rule J, and a guiding link $F^3$ is secured also to the rule and to the link $F^2$. Normally the latch F is held in its closed position (see Fig. 6) by a spring $F^4$. Adapted to project into the path of the rod $F^2$ is a horizontally disposed rod G (Figs. 1 to 6 and 8) which can be moved longitudinally and is carried in brackets on the frame A. At one extreme of its travel the end of this rod G forming the intercepter is in position to encounter the end of the rod $F^2$, as shown in Fig. 5, so that when the rule J approaches the upper end of its travel, the rod $F^2$ will be prevented from rising any farther, and, the rule J continuing to rise carrying with it the latch F, the latter is caused to turn on its hinges outward and assume the position shown in Fig. 5, being thereby prevented from engaging the hooks $E^3$ on the pushers E E. When the rule again descends, as shown in Fig. 6, and the line has passed into the galley, no lead is delivered, as although a lead has been forced into the undercut portion of the pushers it is held there by the pressure of the spring lever D, and the slides E E are also retained in their up position by the pressure of the lever D acting through the leads. When, however, the rod G is at the other extreme of its travel, as shown in Figs. 3 and 4, its outer end is withdrawn from the path of, hence does not encounter, the rod F², so that the latch F, under the action of its spring F⁴, snaps over the hooks E³ (see Fig. 4) and when the rule J and latch F next descend the slides E E are drawn down carrying the lead which is in the undercut portions E² down free of the spring pressure, whence the lead drops to the level of the galley as already stated.

The starting and stopping mechanism H for actuating the rod G in the manner described is shown in Figs. 1, 3, 6 and 8. It comprises a disk H′ having two series of notches H² H³ of different depths around its periphery, the deep notches H² alternating with shallow notches H³. The notches are such that when one end of the rod G is in contact or is received in a shallow notch H³ the other end of rod G lies in the path of rod F² of the actuating devices and when in engagement with a deep notch H² the rod G lies outside said path so that it does not intercept the upward movement of the rod F². A spring G², mounted between a collar on the rod G and one of the rod-carrying brackets, operates to force the rod G into contact with the periphery of the disk H′ and to return it from the projected to the withdrawn position. On the shaft $h$ of the disk H′ is mounted a ratchet wheel H⁴ (see Fig. 8) with which engages a pawl H⁵ mounted on a bell crank lever H⁶ loosely pivoted on shaft $h$. The pawl is mounted on one arm of the lever and to the other arm is pivoted a downwardly extending actuating rod H⁷ which carries at its lower end a hook H⁸. This rod is maintained in its upper position by a spring H⁹ and is guided by a link H¹⁰ pivoted to the rod and to a stationary support. When the rod H⁷ is pulled downward, as hereinafter described, it rotates the ratchet wheel to the extent of one tooth so that the rod G, if it has been in engagement with a shallow notch H³ in the disk H′, now enters a deep notch H², the effect being, that the rod G is alternately projected and retracted by the intermittent or step-by-step rotation of the ratchet wheel H⁴ and disk H′.

In order that the same leading device may take leads of varying thicknesses, also in order to prevent a lead passing too far into the undercut part of the slides, and thereby allow a second lead to partially enter and be engaged by the shoulders E², the slides E E are each provided with detachable and interchangeable plates E⁴ (see Fig. 7) or stops, so that the different thickness of lead may be accommodated properly in the undercut portion of the slides with the face of the lead in the undercut portion flush with the face of the slide.

In the type casting and composing machine to which the leading attachment, according to the present invention, is shown applied, the die case 2, as already stated, is centered over the mold by two movements at right angles to one another. After being centered, it is lowered to press the selected matrix firmly onto the top of the mold, and is raised, after the casting operation, to effect a subsequent centering. In the present embodiment, advantage is taken of the descent of the die-case 2 to effect the pulling down of the actuating rod H⁷, and for this purpose the die case is brought to a particular position for starting and stopping the leading device. It is a feature of the present invention that the same signal starts and stops the leading device alternately. The die case of the casting machine illustrated in the drawings is centered over the mold, the centering movement being controlled by the pins of the series 7 and 8. The nose 2ˣ of the die case 2 is utilized for engaging the hook H⁸ on the rod H⁷ (see Figs. 1 and 8) and the die case assumes this position of engagement when the matrix in one of the extreme corners is centered over the mold, in which position the die case is shown in Figs. 1 to 3 and 8. This position is one in which the die case is nearest to the rod H⁷ at the extremes of its movements in its two directions of movement and is the only one in which the nose 2ˣ will engage the hook H⁸ on rod H⁷.

Figure 9:
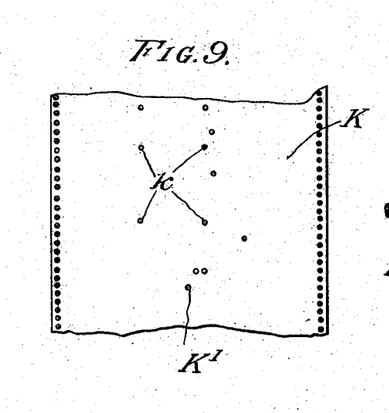
Fig. 9 is a view of a portion of the record strip showing the perforation or signal which on its first presentation in the casting or type setting machine brings the leading mechanism into action, and upon its second occurrence, in the record strip, throws the leading mechanism out of action.

At Fig. 9 is illustrated a portion of the record strip K for use in the casting machine described, and the perforations $k$ therein denote perforations for producing various characters. The perforation K′, however, is that which corresponds with port 17 in the cross bar 12 on the casting machine and thereby admits air through perforations K′, port 17 and ducts indicated by line 18, to the underside of the end pin 7ˣ in the block or series 7, so that the die-case is moved to its extreme left or first position, that is to say, the position to center the first matrix of a row, over the mold. The die case is also moved to a position determined by the series of pins 8; it so happens that the position selected corresponds with the last row of matrices, hence requires no perforation in the record strip; the first matrix of the last row is thus indicated and centered over the mold. The reason why no perforation is required, corresponding to the end pin of series 8, to bring the aforesaid row of matrices in line with the mold cavity, is that this row represents one extreme position of the die case in the direction controlled by the pin of series 8 and is indicated by a fixed pin. These two movements bring the die case 2 into the selected position as already stated to engage the nose $2^x$ with hook $H^8$ before the die case descends, the subsequent descent effecting the pulling of rod $H^7$ downward.

It is apparent that the starting and stopping device described may be controlled manually, if desired, but it is specially designed to be actuated automatically by the record-strip or pattern which governs the operations of the automatic casting so that the operations of the leading devices may be under the care of the composer of the record strip, and, therefore, calling for no special attention on the part of the casting machine attendant. The record strip or pattern is prepared on a separate machine which is well known. As the present invention does not necessarily involve any alteration, rearrangement or modification of the record-strip preparing machine, it is not necessary here to enter into details of its construction or operation; sufficient is it to say that it comprises a keyboard, the keys representing the same characters as find place in the die case of the casting machine, and these keys control a series of punches which perforate the record strip on a prearranged system. Such a machine is fully described in the specification of United States Patent No. 654,115. When the compositor operating such a machine, desires the matter composed to be leaded, he presses a signal key producing the required perforation $K'$ in the pattern or record-strip. As already stated, the signal selected, for convenience, is that shown in Fig. 9. The compositor presses this key or produces the perforation $K'$, both at the commencement and the finish of the composition of the record strip for the matter to be leaded. It is not necessary to repeat this leading signal with each line to be leaded, but only to produce it at a start and finish. As is well known, the record strip in the machines referred to is passed through the casting machine in the reverse order to composition, so that the last line composed is actually the first to be cast. The compositor, therefore, produces the leading signal which starts the leading device after he has composed the last line, and the signal which effects the stopping of the leading device is produced in the record-strip before the composition of the first line. As, in accordance with this invention, the same signal is used to start as to stop the leading device, there is no liability of the compositor giving the incorrect signal.

In the casting machine according to Patent No. 625,998, when the die case is placed in position to center the selected matrix block over the mold, a cast is made but with the present arrangement the air connections to the pin $7^x$ will be so arranged that when the die case is in the "leading" position, the pump will be thrown out of action and no cast will take place.

Assuming the leading device to be out of action, the first presentation of the perforation $K'$ to port 17 of the cross bar results in the projection of pin $7^x$ of series 7, and the die case 2 under the influence of its centering mechanism acting on rods 5 and 6, takes up the position indicated in Fig. 1 in which the nose $2^x$ of its central guide is directly over the hook $H^8$ on rod $H^7$. The die case having been centered, descends under the action of lever 9 and the nose $2^x$ pulls down the rod $H^7$ against the action of spring $H^6$. The downward movement of the rod $H^7$ causes pawl $H^5$ to turn ratchet wheel $H^4$ and disk $H'$, allowing rod G to be retracted by spring $G^2$ so that it does not intercept the upward movement of rod $F^2$. The latch F, therefore, engages slides E E and draws them down. Leads are thus delivered automatically with each line until the second presentation to cross-bar 12 of the perforation $K'$ when rod $H^7$ is again drawn down and wheel $H^4$ and disk $H'$ moved through the distance of one more tooth, bringing a shallow notch $H^3$ into contact with rod G which is, therefore, projected and its ends caused to intercept rod $F^2$ and prevent catch F engaging the hooks on slides E E.

As a modification, in place of the rod $H^7$ being controlled through the die case from the record strip, a special air propelled pin may be provided to operate the rod through a pivoted lever or the like. In this case the pipe from port 17 in cross bar 12 will lead to a cylinder in which the special pin works, and the pin when first projected will effect the pulling down of the rod $H^7$, to, say, start the leading device by turning ratchet wheel $H^4$, and on its second occurrence will pull the rod $H^7$ to again move the ratchet wheel $H^4$ and stop the leading.

The lines of composition and the leads exactly fit the galley and it is, therefore, necessary that the lead positioned at the entrance of the galley be located accurately with reference to the sides of the galley, otherwise, one or the other of its ends will foul the walls of the galley. To insure this, a striker is employed which comprises, conveniently, a lever L pivoted at $l$ to a lug on one of the uprights C. The lever L extends downwardly, its lower end entering the slot in the rule J sufficiently far to strike, when operated, the end of the lead within the slot in the rule J. An arm $L'$ is attached to the lever L and projects through the slot $a^2$ in the frame of the leading device in position to engage the pivot pin or stud $15^x$ of hook 15, when the latter advances. The stud $15^x$ draws arm $L'$ back against the action of spring L² until arm L' overrides the stud when the spring L² causes lever L to strike the lead within the rule and force it against the side wall of the galley.

Having thus described my invention, what I claim as new and desire to secure by Letters Patent, is:—

1. In a leading attachment for composing machines the combination of the following elements, to wit; a magazine for the leads; a pusher or delivery slide at the discharge end of said magazine; a latch carried by a moving part of the machine in position to directly engage said pusher; and controlling means for said latch.

2. In a leading attachment for composing machines the combination of the following elements, to wit; a receiving galley; a superposed magazine for leads; a pusher at the delivery end of said magazine provided with a shoulder for engaging the end lead; a spring actuated follower engaging the leads to advance the latter and sustain the pusher; actuating devices for the pusher including a latch carried by a moving member and adapted to engage the pusher; and means for effecting the engagement and disengagement of the latch and pusher.

3. In a leading attachment provided with a magazine and a pusher and in combination therewith actuating devices including a latch engaging the pusher to reciprocate the latter, and controlling means for said latch, including a step-by-step advancing member connected with the latch and operating to alternately couple and uncouple the latter and the pusher.

4. In a leading attachment for composing machines the combination of the following elements, to wit; a magazine for the storage of leads; a pusher at the discharge end of said magazine adapted to engage and expel the foremost lead; actuating devices for said pusher adapted to be coupled with and uncoupled from the latter; and means for automatically controlling the actuating devices including a member receiving a step-by-step progressive movement and operating at each alternate step to couple the actuating devices with the pusher.

5. In a leading attachment for composing machines, the combination of the following elements, to wit; a horizontally disposed magazine for receiving a column of leads; a vertical pusher supported in guides at the delivery end of the magazine; a spring actuated follower in rear of the column of leads and acting through the latter to sustain the pusher in elevated position; reciprocating actuating devices normally disconnected from the pusher but adapted to be coupled therewith; and controlling devices including a step-by-step progressively moving member and means connected therewith for coupling the actuating devices with the pusher at each alternate stepwise movement.

6. In a leading attachment for composing machines the combination of the following elements, to wit; a magazine; a pusher movable transversely of the magazine at the discharge end thereof; actuating devices including a reciprocatory member provided with a latch adapted to engage a hook or shoulder on the pusher; and controlling means for said latch including a movable member adapted to be projected into the path traversed by the latch or of a part connected with the latter, for preventing the engagement of said latch with the pusher.

7. In a leading attachment for composing machines provided with a magazine and reciprocatory pusher and in combination therewith actuating devices for the pusher including a reciprocating member carrying a spring actuated latch for coupling said member with the pusher to reciprocate the latter, and controlling devices for said latch including an intercepter movable in and out of the path traversed by a contact piece on the latch, and a step-by-step mechanism for reciprocating said intercepter alternately into and out of the path of said contact piece.

8. In a leading attachment for composing machines the combination of the following elements, to wit; a magazine; a pusher; actuating devices for the pusher including a latch carried by a reciprocating member; and means for alternately coupling and uncoupling said actuating devices including an intercepter for the latch and step-by-step actuating means for said intercepter.

9. In a pattern or record strip controlled composing machine provided with a galley mechanism including a rule at the entrance to the galley whose movements are governed by the pattern, and in combination therewith, a leading attachment including a magazine overlying the galley; a pusher at the discharge end of the magazine, a latch mounted upon the galley rule in position to engage the pusher, and means controlled by the pattern or record strip for alternately coupling and uncoupling the latch and pusher, said means including an intercepter for the latch, a cam with two series of engaging surfaces differing in projection and alternating in sequence, and a step-by-step advancing means for said cam.

10. In a type casting and composing machine such as described and in combination with the movable die case thereof, a leading attachment provided with actuating devices adapted to be thrown into and out of action by the die case.

11. In a composing machine such as described, provided with a pattern or record strip controlled die case and galley mechanism and in combination therewith a leading attachment and means controlled by the die case for actuating said attachment to deliver leads to the galley.

12. In a pattern or record strip controlled composing machine such as described provided with a movable die case and a galley mechanism and in combination therewith a leading attachment or mechanism provided with actuating devices and means controlling said actuating devices said means being in turn controlled by the die case.

13. In a pattern or record strip controlled composing machine such as described and in combination with the movable die case and the galley mechanism thereof, a leading attachment or mechanism including a magazine overlying the galley, a pusher in position to engage and deliver the leads one at a time, actuating devices adapted to be connected and disconnected from said pusher, and means for controlling the coupling and uncoupling of said actuating devices and pusher including a member registering with the die case when the latter is adjusted to a position predetermined by the controller or record strip.

14. In a pattern or record strip controlled composing machine, the combination with the galley mechanism, of a leading attachment or mechanism provided with actuating means adapted to be thrown into and out of action and controlling means therefor responding to a succession of identical signals of the pattern or record strip and operating to throw the actuating means into and out of action alternately, in response to recurring signals.

15. In a type composing machine the combination with a leading attachment or mechanism, actuating devices therefor, of a controlling pattern or record strip provided with a special leading signal and means whereby successive recurrences of said signal alternately stop and start the leading devices.

16. In a composing machine such as described provided with a slotted or hollow reciprocating rule at the entrance to the galley and in combination therewith a leading attachment including the following elements, to wit; a magazine disposed above the galley with its discharge opening in register with the opening in the rule, a pusher in alinement with said discharge opening, a spring actuated follower and a latch mounted upon the rule and movable into and out of engagement with said pusher.

17. In a composing machine the combination of the following elements, to wit; a galley mechanism provided with a reciprocating slotted or hollow rule at the entrance to the galley; a leading mechanism located above the galley and including a magazine provided with a discharge opening in line with the rule and a pusher; a spring actuated latch mounted upon the rule in position to engage the pusher; actuating means coupled with said latch; and an intercepter movable into the path of said actuating means to retract the latch and prevent its engagement with the pusher.

18. In a leading attachment or mechanism for composing machines, the combination with a magazine for the leads of a reciprocating pusher located at the delivery end of the magazine and recessed for the reception of the lead, and a detachable sizing plate located in said recess.

19. In a leading mechanism for composing machines provided with a magazine, a reciprocatory pusher for discharging the leads and a latch carried by a reciprocating member for detachably engaging said pusher, and in combination therewith, controlling means for said latch including a cam or disk provided with two sets of notches or bearings differing in elevation or projection and alternating in series, and a step-by-step advancing mechanism for said cam or disk.

20. In a leading mechanism for composing machines the combination of the following elements, to wit; a magazine provided with a pusher; a reciprocating rule provided with a latch adapted to engage said pusher; an intercepter for the latch in position to retract the latter during the movement of the rule; a notched disk or cam coupled with said intercepter and provided with two sets of notches or bearings differing in projection the members whereof are arranged alternately in series; and a pawl and ratchet mechanism for advancing said disk or cam progressively step-by-step to present alternate notches or bearings to the intercepter.

21. In a leading mechanism for composing machines provided with a transversely slotted reciprocating rule at the entrance of the galley and in combination therewith a spring actuated striker projecting into the slot of the rule and means for retracting said striker against the pressure of its spring and subsequently releasing the same.

22. In a composing machine provided with a galley mechanism including a galley, a reciprocating slotted rule at the entrance to the galley and a line carrier in front of the rule and in combination therewith a pivoted striker projecting within the rule near one end thereof, and means for reciprocating said striker including a spring and transmitting devices intermediate said striker and rule.

23. In a composing machine provided with a galley mechanism including a line carrier and a vertically slotted reciprocating rule at the entrance to the galley, and in combination therewith a leading mechanism delivering vertically into the slot in the rule and a spring actuated striker projecting into the slot in the rule and provided with an arm projecting into the path traversed by the line carrier.

24. The combination with the galley of a type casting and composing machine, of a leading attachment located in proximity to the entrance to the galley and pivotally supported to be swung away from the galley to uncover the latter.

FRANK HINMAN PIERPONT.

Witnesses:
B. WILLARD,
H. D. JAMESON.